Figure 1:
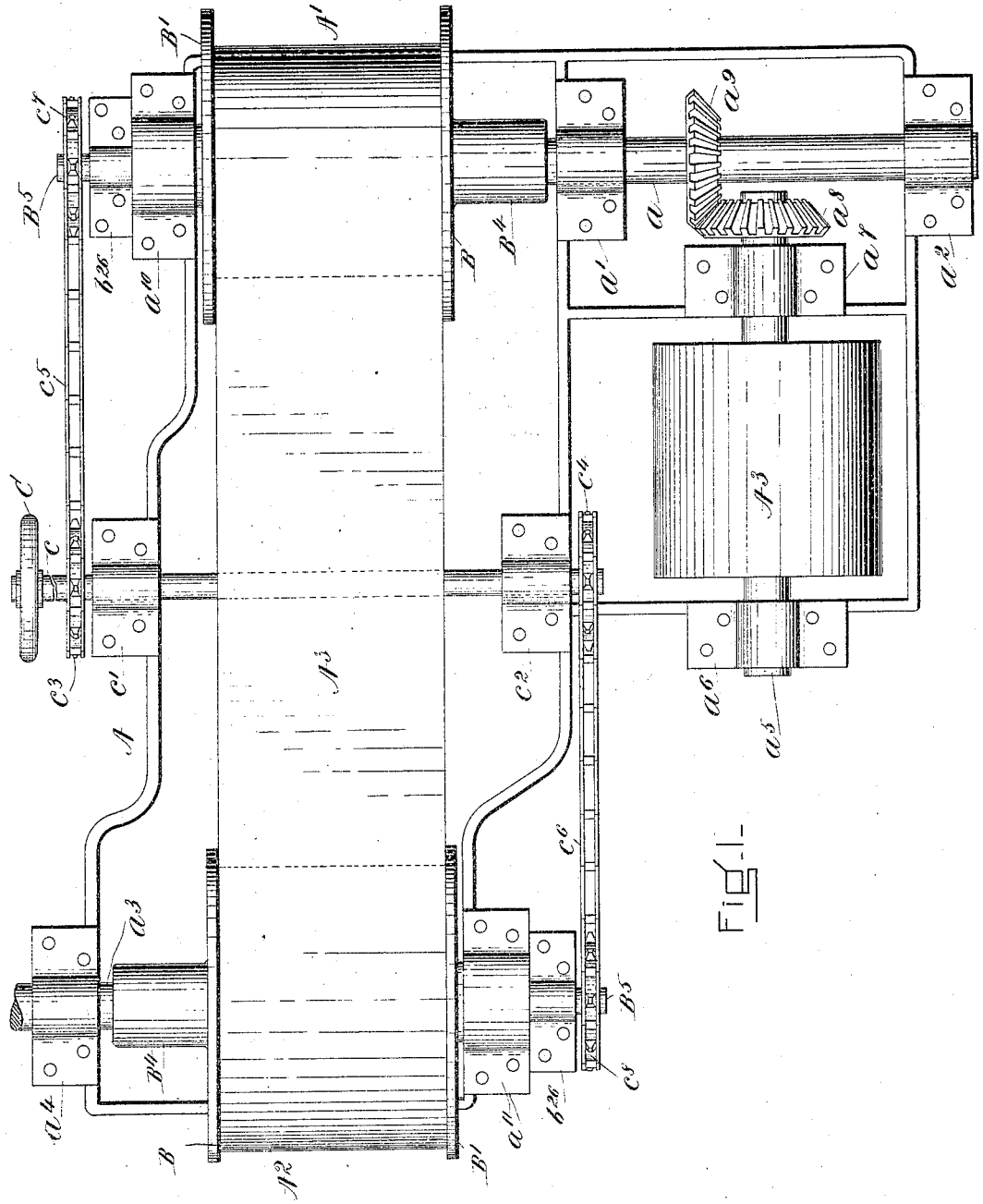

No. 789,136. PATENTED MAY 9, 1905.
W. M. BARBER.
EXPANSIBLE PULLEY.
APPLICATION FILED MAR. 7, 1904.

3 SHEETS—SHEET 1.

WITNESSES:
J. M. Dolan.
M. V. Foley.

INVENTOR:
William M. Barber
by Charles Raymond Brown
his attorney.

No. 789,136. PATENTED MAY 9, 1905.
W. M. BARBER.
EXPANSIBLE PULLEY.
APPLICATION FILED MAR. 7, 1904.

3 SHEETS—SHEET 3.

WITNESSES:
INVENTOR:

No. 789,136.

Patented May 9, 1905.

UNITED STATES PATENT OFFICE.

WILLIAM M. BARBER, OF SOMERVILLE, MASSACHUSETTS, ASSIGNOR OF ONE-HALF TO EDGAR W. ANTHONY, OF BROOKLINE, MASSACHUSETTS.

EXPANSIBLE PULLEY.

SPECIFICATION forming part of Letters Patent No. 789,136, dated May 9, 1905.

Application filed March 7, 1904. Serial No. 196,814.

*To all whom it may concern:*

Be it known that I, WILLIAM M. BARBER, a citizen of the United States, and a resident of Somerville, in the county of Middlesex and State of Massachusetts, have invented a new and useful Improvement in Expansible Pulleys, of which the following is a full, clear, and exact description, reference being had to the accompanying drawings, forming a part of this specification, in explaining its nature.

My invention relates to an improvement in "expansible" pulleys of the class, so called, pertaining especially to an improved means by which the expansion or contraction of the pulleys may be obtained, together with means by which the pulleys when belted together may be simultaneously correspondingly but reversely changed, the one becoming contracted as the other is expanded, and vice versa.

The special object of my invention is to strengthen, simplify, and make as compact as possible the means by which the adjustment of the pulleys may be obtained and by which means also they may be changed or varied with certainty and exactness, this, moreover, when the pulleys are in operation, and when changed their parts may be held fixed in place without danger of accidental displacement.

Inasmuch as my improved expansible pulleys are especially adapted to be belted together, I have shown them in the drawings in this connection.

Figure 2:
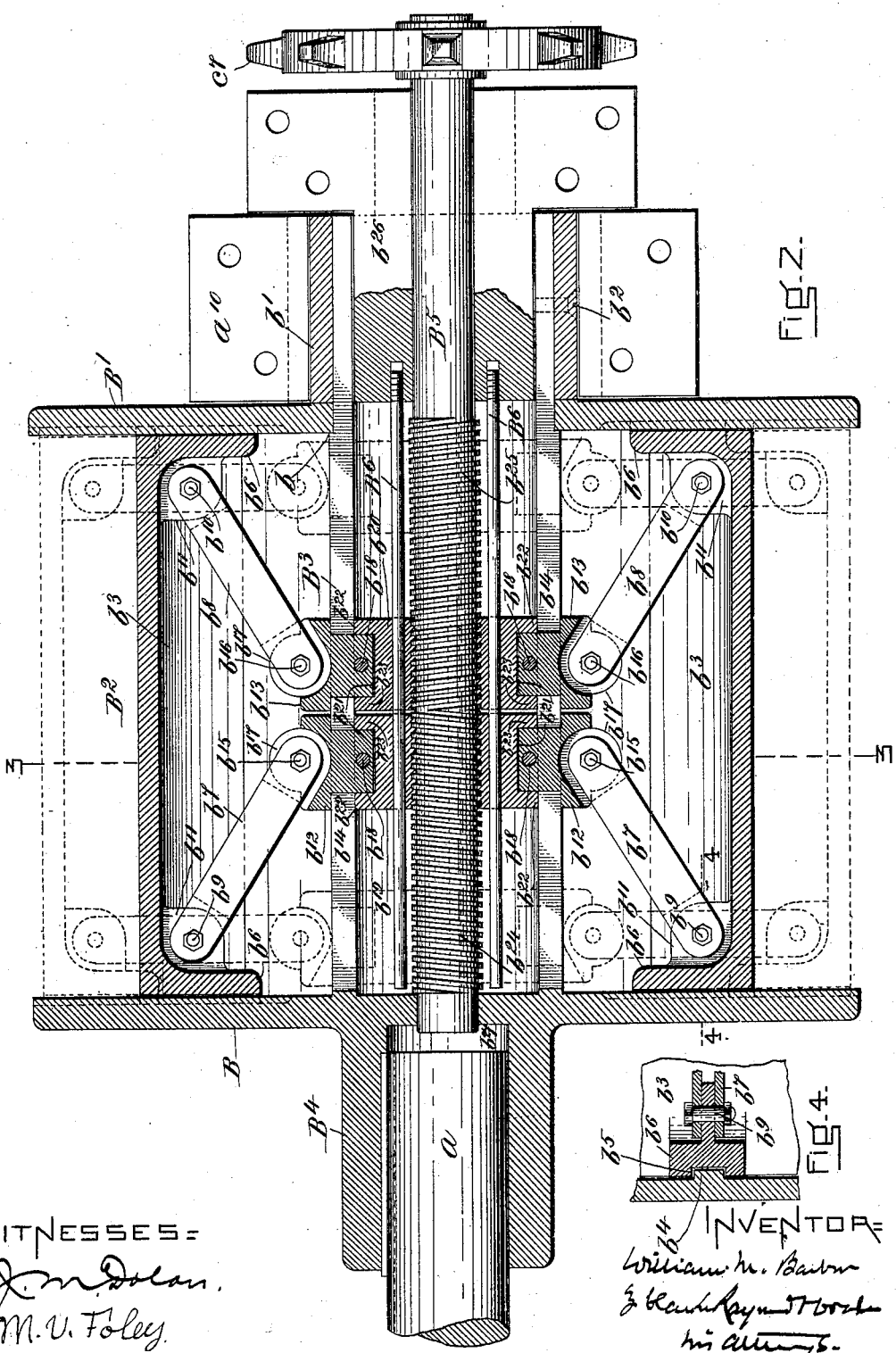
Figure 3:
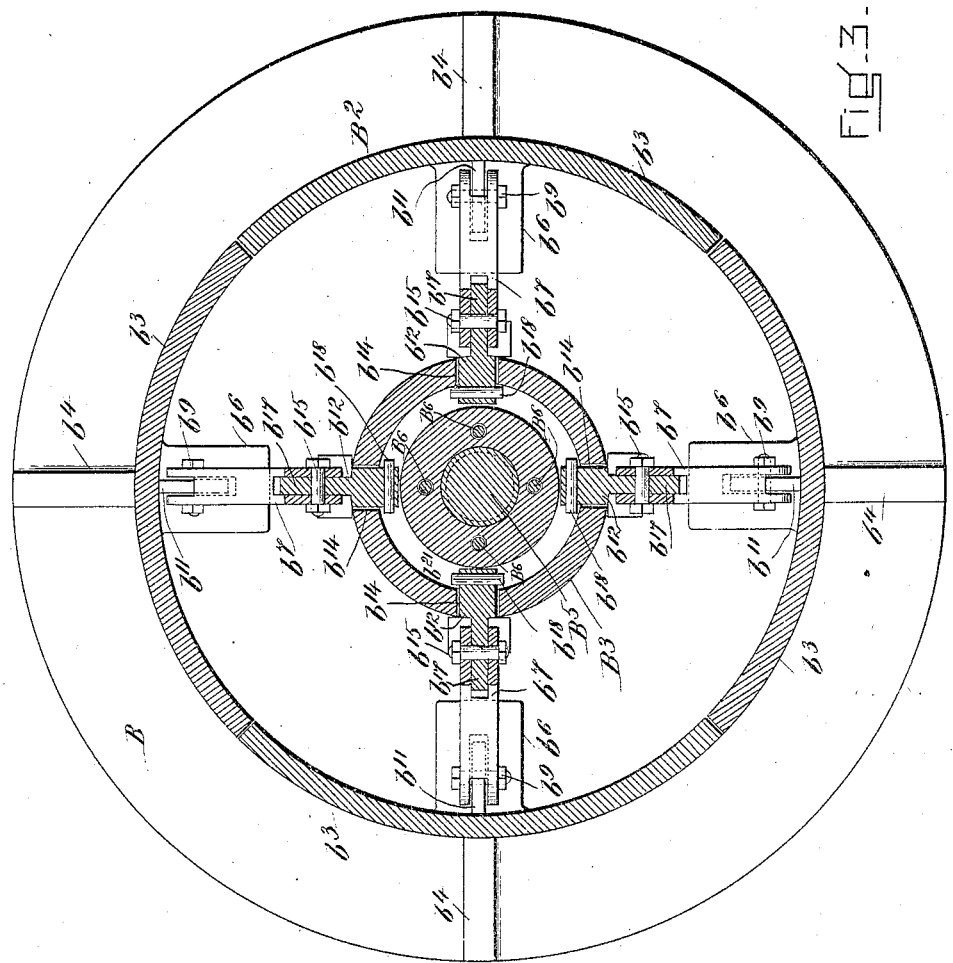

Referring to the drawings, Figure 1 shows in plan the pulleys belted together, with various details illustrating their means of support and the means by which their adjustment may be obtained, as will hereinafter be explained. Fig. 2 shows a cross-section through one of the pulleys, both of which are alike, as will hereinafter be explained. Fig. 3 shows a cross-section on the line 3 3 of Fig. 2. Fig. 4 shows a cross-section on the line 4 4 of Fig. 2.

In the drawings, A represents a frame of arbitrary character, upon which are mounted the pulleys or drums $A'$ $A^2$. The pulleys are connected by a belt $A^3$ or other connection by which the motion of one pulley is communicated to the other, $A'$ representing the driving-pulley and $A^2$ the follower or pulley driven. In the operation of the pulleys motion given to the pulley $A'$ would be communicated to the pulley $A^2$ and thence to the drum, wheel, or other member rotated thereby. Motion is given the pulley $A'$ by a shaft $a$, turning in boxes $a'$ $a^2$, fixed to the frame, while motion is transmitted from the driven pulley $A^2$ to the member rotated thereby through a connecting-shaft $a^3$, having bearing in the box $a^4$. The manner in which these shafts connect with their respective pulleys will hereinafter be explained.

As a means illustrative of the manner in which rotary motion may be given the shaft $a$, connecting with the driving-pulley $A'$, I have shown a pulley $A^3$ arranged on a shaft $a^5$, turning in the boxes $a^6$ $a^7$ on the frame. The shaft $a^5$ carries on its end a gear $a^8$, engaging with a gear $a^9$ on said shaft $a$, whereby motion given to the pulley $A^3$ from any source is transmitted to the shaft $a$ to give motion to the driving-pulley $A'$. This means just referred to, however, is entirely arbitrary and, as said before, is shown merely for purposes of illustration.

The pulleys $A'$ $A^2$ are alike in their construction, so that a description of one will answer for the other, and they are so made that the relative diameters of their respective faces or the portions thereof around which the belt winds may be varied at will and this when the pulleys are in operation. Referring, therefore, to the construction of the pulleys, each pulley comprises the disk-like sides B B' and the cylindrical face $B^2$. The side B has projecting from its center internally a hollow shaft $B^3$, forming the hub of the pulley. On the end of this hollow shaft $B^3$ there fits the side B' of the pulley, wherefore the two sides thereof are arranged in proper opposition. The side B' fits to rest against an annular shoulder $b$ on the shaft $B^3$, which shoulder defines the distance separating it from the opposite side B of the pulley, and it is held in place by the collar $b'$, fitting onto the end of the hollow shaft $B^3$, projecting through the side B', the collar being fixed to the end of the shaft by means of one or more set-screws $b^2$. The external hub $B^4$ is also to be noted projecting from the side B of the pulley. Motion is given to or transmitted from the respective pulleys from the side, so as not to interfere with its interior mechanism, hereinafter to be referred to, and the hub $B^4$ acts to receive the shaft by which such motion is given or transmitted, which, as may be seen by reference to Fig. 1, is the shaft $a$ for the driving-pulley $A'$ and the shaft $a^3$ for the driven pulley $A^2$. Moreover, these shafts connecting as they do furnish means for mounting one side of the respective pulleys, the other side being mounted by the projecting end of their hollow shafts or hub having bearing in a box fixed to the frame, which for the pulley $A'$ is the box $a^{10}$ and for the pulley $A^2$ the box $a^{11}$. The face $B^2$ of each of the respective pulleys between the two sides is made up of a series of individual segments $b^3$, which segments when in a position contiguous with one another form a continuous surface or cylindrical face of relatively minimum diameter, but which when moved out radially with the segments separated from one another give a gradually-increasing relative diameter to the face of the pulley. As many of these segments may be employed as desired; but four segments, each forming a quadrant of a circle when the edges are contiguous, is the preferred number. The segments $b^3$ are moved out on true radial lines at the same relative distance from one another, and for this purpose there are formed internally on the respective sides B B' of the pulley the radially-extending ribs $b^4$, along which the segments are guided in their radial movement. This effect is obtained by means of grooves $b^5$, formed along the side edges of the respective segments, at which points they are provided with guiding-flanges $b^6$, along which the grooves are made. The segments are each moved out radially by means of the links $b^7$ $b^8$ in the interior of the pulley. These links are preferably made with cleft ends by which at one end the links are pivotally joined to their respective segments at opposite sides thereof, the pivotal connections being designated $b^9$ $b^{10}$ and are obtained by the cleft ends of the respective links fitting upon bosses $b^{11}$, projecting from the segments back of their flanges $b^6$ at either side thereof. The other ends of the links are pivotally joined, respectively, to the respective members or blocks $b^{12}$ $b^{13}$, which are adapted to travel or slide longitudinally in slots $b^{14}$, cut longitudinally along through the hollow shaft $B^3$. Pivotal connection between the links and sliding blocks is made by pin connections $b^{15}$ $b^{16}$, with the cleft ends of the links fitting upon bosses $b^{17}$ $b^{17}$, projecting from said blocks. The sliding blocks $b^{12}$ $b^{13}$ for all the segments are retained to travel or slide in their respective grooves in the hollow shaft by the heads thereof being wider than the slot in said shaft and with the bodies of the blocks extending through the slots in the shaft to project on the inside thereof, where they are retained by cross-pins $b^{18}$. The connecting-links $b^7$ $b^8$ are of such equal length and the sliding blocks so relatively disposed that the sliding blocks will be in close proximity when the segments forming the face of the pulley are nearest the center thereof, with the effect that when the blocks are slid in reverse direction to one another the segments are moved out to a maximum or drawn in to a minimum radial position or fixed at any intermediate position dependent upon the relative position of the respective blocks. The relative diameter of the face of the pulley is in this way defined. It is of course necessary that the respective sets of sliding blocks $b^{12}$ $b^{13}$ for all the segments should be moved simultaneously in reverse direction in order that all the segments may be advanced or retracted an equal amount, so preserving the relative cylindricity of the face of the pulley. For this purpose there are provided inside the hollow shaft $B^3$ the traveling nuts $b^{19}$ $b^{20}$, corresponding with the respective sets of sliding blocks. These nuts are made alike annular in form of about the internal diameter of the hollow shaft, but not so as to interfere with the shaft turning, for the nuts are fixed, as will be hereinafter explained. Around the periphery of each of the respective nuts is cut an annular groove $b^{21}$, leaving shoulders $b^{22}$ $b^{23}$ on either side thereof. Into the annular grooves $b^{21}$ there fit the ends of the sliding blocks which project through the slots in the hollow shaft, as before explained. These projecting ends if the nuts be moved will be engaged by the annular shoulder $b^{22}$ or $b^{23}$, depending as the nut is moved in one direction or the other and with the effect that if the respective nuts be moved simultaneously in reverse direction the corresponding sets of sliding blocks will be carried with them. For the purpose of moving the traveling nuts in reverse direction they are arranged upon the screw $B^5$, extending from the open end of the shaft $B^3$ into the hollow thereof. The screw $B^5$ is cut with right and left threads $b^{24}$ $b^{25}$, and the respective traveling nuts are fitted upon these threads. The screw $B^5$ is supported at one end to turn in a box $b^{26}$, a portion of which box extends into the projecting end of the hollow shaft, closing the open end of the same, and said screw at its other end projects to have bearing in a hole $b^{27}$, formed in the side B of the pulley. The traveling nuts $b^{19}$ $b^{20}$ are stayed against turning by the rods $B^6$, shown fixed in the end of that portion of the box $b^{26}$ which extends into the projecting end of the hollow shaft, with the effect that when the screw $B^5$ is turned these nuts will be moved simultaneously in reverse directions toward and from one another, operating, as before explained, to carry with them the sliding blocks or members, while they in turn, through the links connecting with the segments forming the face of the pulley, move radially out or in, so increasing or diminishing the relative diameter of the face of the pulley, depending as the traveling nuts and sliding blocks are moved reversely in one direction or the other, this of course depending upon the direction the operating-screw is turned. The utility of this means for effecting the adjustment of the pulley consists perhaps more especially in its simplicity and compactness, it being contained for the most part within the hollow of the pulley, also in the certainty and exactness with which the pulley while in operation may be contracted or expanded, for the segments comprising the face of the pulley within the limits of their adjustment may be adjusted to and held fixed at practically any point of adjusted position, effecting thereby an accuracy and exactness in speed regulation, which is of the utmost importance, especially when the pulley is used for certain kinds of work.

When the pulleys are belted together as a means for turning in reverse directions, their screws $B^5$ in order to simultaneously correspondingly but reversely change the respective pulleys, or, in other words, to contract the one while the other is expanded, I have arranged between the pulleys a hand-wheel C upon a shaft $c$, turning in boxes $c'$ $c^2$, fixed to the frame. Upon this shaft $c$, at either end thereof, are arranged sprockets $c^3$ $c^4$, respectively, which by chains $c^5$ $c^6$ connect with the respective sprockets $c^7$ $c^8$, fixed on the ends of the respective screws $B^5$. By simply turning the wheel C thus connected the screws $B^5$ will be turned in reverse direction to one another, which direction is changed depending as the wheel C is turned in one direction or the other and with the effect that one pulley is contracted as the other is expanded, or vice versa. With such relative change in the pulleys the speed of the driven pulley is of course increased or diminished, so increasing or diminishing or, in other words, changing the speed of the roll, drum, or other operative member operated by it.

Having thus fully described my invention, I claim and desire to secure by Letters Patent of the United States—

1. An expansible pulley having a hollow, internal hub, and a number of adjustable segments forming the face of the pulley, links pivoted to said segments for adjusting them, and means for operating said links from within the hollow of said hub of the pulley.

2. An expansible pulley having an expansible face comprising a series of adjustable segments and a hollow hub having slots cut therein, members adapted to travel in said slots formed in the hub of the pulley and be rotatable therewith, means connecting said traveling members with said segments forming the face of the pulley for effecting their adjustment, and means within said hollow hub of the pulley and non-rotatable therewith for moving said traveling members.

3. An expansible pulley having an expanding face comprising a series of adjustable segments, a hollow hub with slots cut therein, members adapted to travel in said slots, links connecting said members and the segments forming the face of the pulley, and means for moving said members simultaneously in reverse directions.

4. In an expansible pulley having an expansible face, a hollow, rotatable hub, means inside said hollow hub non-rotatable therewith, and connecting with, for effecting the adjustment of said expansible face of the pulley.

5. In an expansible pulley, a hollow, rotatable hub with slots cut therein, traveling members adjustable in said slots, and means inside said hollow hub of the pulley non-rotatable therewith, for effecting the adjustment of said traveling members.

6. In an expansible pulley, a hollow, rotatable hub with slots cut therein, members adapted to travel in said slots, a right-and-left screw inside said hollow hub, and adjustable nuts arranged thereon, said nuts being adapted to connect with, for effecting the adjustment of said traveling members, and means for fixing said nuts to be non-rotatable with said hub of the pulley.

7. An expansible pulley having two sides and a hollow, slotted hub extending between the same, said hub extending from one to project through the other of said sides and upon which hub said other side is detachably mounted, segments forming the face of the pulley, adjustable between its said sides, members fixed to travel within said slots in the hollow hub, links connecting said traveling members with said segments, and means within said hollow hub for moving said traveling members reversely in opposite directions.

8. In an expansible pulley, a hollow hub having a series of spaced slots cut longitudinally therein, members adapted to travel in said slots and be rotatable with said hub of the pulley, a portion of which members projects into the hollow of the hub, a non-rotatable means within said hollow of the hub adapted when moved longitudinally to engage with said projecting portions of the said members for effecting the adjustment of the same, and operating mechanism for the means aforesaid.

9. In an expansible pulley, a hollow hub having slots cut therein, members fixed to travel in said slots, a portion of which members extend through said slots to project within said hollow hub, traveling nuts inside said hollow hub, said nuts each having an annular groove cut in its periphery into which grooves for the respective nuts the projecting portions of said members are adapted to extend, means for fixing said nuts against else than a longitudinal movement, and a right-and-left screw within the hollow of the hub for moving said nuts longitudinally in reverse directions.

10. An expansible pulley having two sides and a hollow, connecting hub with a series of slots cut longitudinally therein, segments comprising the face of the pulley and radially adjustable between its sides, sliding members, $b^{12}$, $b^{13}$, respectively, retained in said slots in the hollow hub and rotatable therewith, traveling nuts, $b^{19}$, $b^{20}$, inside said hollow hub, with which said sliding members combine, a right-and-left screw upon which said nuts are arranged, and means for staying said nuts against else than a reverse longitudinal movement upon said screw.

11. An expansible pulley, having adjustable segments comprising the face thereof, and a hollow hub with longitudinal slots cut therein, sets of members retained to slide in said slots, a portion of which members extend through said slots to project inside said hollow hub, links pivotally connecting said sets of members with said segments, traveling nuts inside said hollow hub, said nuts each having an annular groove cut in its periphery, within which grooves for the respective nuts the projecting portions of said sets of sliding members are adapted to be contained, means for fixing said traveling nuts against else than longitudinal movement, and a right-and-left screw for moving the same longitudinally in reverse directions.

12. The combination of two belted, expansible pulleys of the character specified, each having a series of individual segments comprising the face thereof with a hollow, internal hub with longitudinal slots cut therein, members adapted to travel in said slots and be rotatable therewith, a portion of which members extend through said slots to project inside the hollow of the hub, means connecting said traveling members with said segments whereby they may be radially adjustable, non-rotatable nuts retained to travel inside said hollow hub and connecting with, for effecting the adjustment of said traveling members, a right-and-left screw for operating said nuts, sprockets arranged upon the ends of said screws for said respective pulleys, a rotary, intermediate shaft, sprockets arranged thereon connected with the sprockets on said screws, and means for turning said shaft whereby said screws are moved in reverse directions.

WILLIAM M. BARBER.

Witnesses:
JOHN E. R. HAYES,
J. M. DOLAN.